(12) United States Patent
Kil et al.

(10) Patent No.: US 10,116,777 B2
(45) Date of Patent: Oct. 30, 2018

(54) MOBILE TERMINAL

(71) Applicant: LG ELECTRONICS INC., Seoul (KR)

(72) Inventors: Minjung Kil, Seoul (KR); Yuntaek Jung, Seoul (KR); Hanseok Chae, Seoul (KR); Seongcheol Lee, Seoul (KR); Woosun Kang, Seoul (KR); Sungyong Shin, Seoul (KR); Soheon Cho, Seoul (KR); Hosang Lee, Seoul (KR)

(73) Assignee: LG Electronics Inc., Seoul (KR)

(*) Notice: Subject to any disclaimer, the term of this patent is extended or adjusted under 35 U.S.C. 154(b) by 384 days.

(21) Appl. No.: 14/841,785

(22) Filed: Sep. 1, 2015

(65) Prior Publication Data

US 2016/0147264 A1 May 26, 2016

(30) Foreign Application Priority Data

Nov. 24, 2014 (KR) .................. 10-2014-0164443
Jun. 4, 2015 (KR) .................. 10-2015-0079290

(51) Int. Cl.
*H04M 1/02* (2006.01)
*G06F 1/16* (2006.01)

(52) U.S. Cl.
CPC .......... *H04M 1/0266* (2013.01); *G06F 1/163* (2013.01); *G06F 1/1626* (2013.01); *G06F 1/1643* (2013.01); *G06F 1/1684* (2013.01)

(58) Field of Classification Search
CPC .................................................. H04M 1/0266
(Continued)

(56) References Cited

U.S. PATENT DOCUMENTS 6,222,114 B1 * 4/2001 Mitamura .............. G04C 10/00
   136/205
7,932,893 B1 * 4/2011 Berthaud .............. G04G 21/00
   178/18.06
(Continued)

FOREIGN PATENT DOCUMENTS

JP   H 10161087 A   6/1998
JP   2003-186429 A   7/2003
(Continued)

OTHER PUBLICATIONS

International Search Report and Written Opinion for Application PCT/KR2015/008194 dated Dec. 3, 2015.

*Primary Examiner* — Jason C Olson
(74) *Attorney, Agent, or Firm* — KED & Associates LLP

(57) ABSTRACT

There is disclosed a mobile terminal including a frame comprising a front surface in which a display unit is loaded, a window disposed on a front surface of the display unit; and a front case configured to cover a predetermined area of the window, wherein the window includes a first window layer comprising a front surface exposed outside, a second window layer larger than the first window layer and comprising a first area of a front surface disposed to face a rear surface of the first window layer and a rear surface facing a front surface of the display unit, and an optical clear adhesive (OCA) provided between the first window layer and the second window layer, and the front case covers a second area arranged around the first area of a front surface of the second window layer, to maintain transparency of a window arranged in a front surface thereof, with an improved rigidity, and to reduce damage to the window.

20 Claims, 16 Drawing Sheets

(58) Field of Classification Search
USPC ........................................................ 345/173
See application file for complete search history.

(56) References Cited

U.S. PATENT DOCUMENTS

| | | | | |
|---|---|---|---|---|
| 8,855,705 | B2* | 10/2014 | Pasquero | ................ G06F 3/016 |
| | | | | 455/41.2 |
| 9,690,127 | B2* | 6/2017 | Liu | ........................ G02F 1/1333 |
| 2010/0073583 | A1 | 3/2010 | Park et al. | |
| 2011/0148771 | A1* | 6/2011 | Lin | ......................... G06F 3/041 |
| | | | | 345/173 |
| 2011/0194234 | A1 | 8/2011 | Kim et al. | |
| 2011/0242023 | A1* | 10/2011 | Lee | ....................... G06F 1/1643 |
| | | | | 345/173 |
| 2013/0088453 | A1* | 4/2013 | Park | ...................... G06F 1/1643 |
| | | | | 345/173 |
| 2013/0194212 | A1* | 8/2013 | Shin | ........................ G06F 3/041 |
| | | | | 345/173 |
| 2013/0330495 | A1* | 12/2013 | Maatta | .................... B23P 11/00 |
| | | | | 428/68 |
| 2014/0226206 | A1 | 8/2014 | Park | |
| 2015/0034621 | A1 | 2/2015 | Timmermann et al. | |
| 2015/0234504 | A1* | 8/2015 | Lee | ......................... G06F 3/047 |
| | | | | 345/173 |
| 2015/0245513 | A1* | 8/2015 | Moon | ....................... G06F 1/20 |
| | | | | 361/679.01 |
| 2016/0001496 | A1* | 1/2016 | Chow | ..................... G06F 3/044 |
| | | | | 345/173 |
| 2016/0004276 | A1* | 1/2016 | Stroetmann | ............ G04G 9/007 |
| | | | | 361/679.03 |

FOREIGN PATENT DOCUMENTS

| | | |
|---|---|---|
| JP | 2003-266533 A | 9/2003 |
| JP | 2015-509458 A | 3/2015 |
| KR | 10-2010-0034918 A | 4/2010 |
| KR | 2011-0032901 A | 3/2011 |
| KR | 2011-0061424 A | 6/2011 |
| KR | 10-2011-0092915 A | 8/2011 |
| KR | 2012-0029960 A | 3/2012 |
| KR | 2013-0005972 A | 1/2013 |
| KR | 10-2013-0105082 | 9/2013 |
| KR | 2013-0105973 | 9/2013 |
| KR | 2014-0101601 A | 8/2014 |
| KR | 20-2015-0000403 | 1/2015 |
| KR | 2010-0054013 A | 5/2015 |

\* cited by examiner

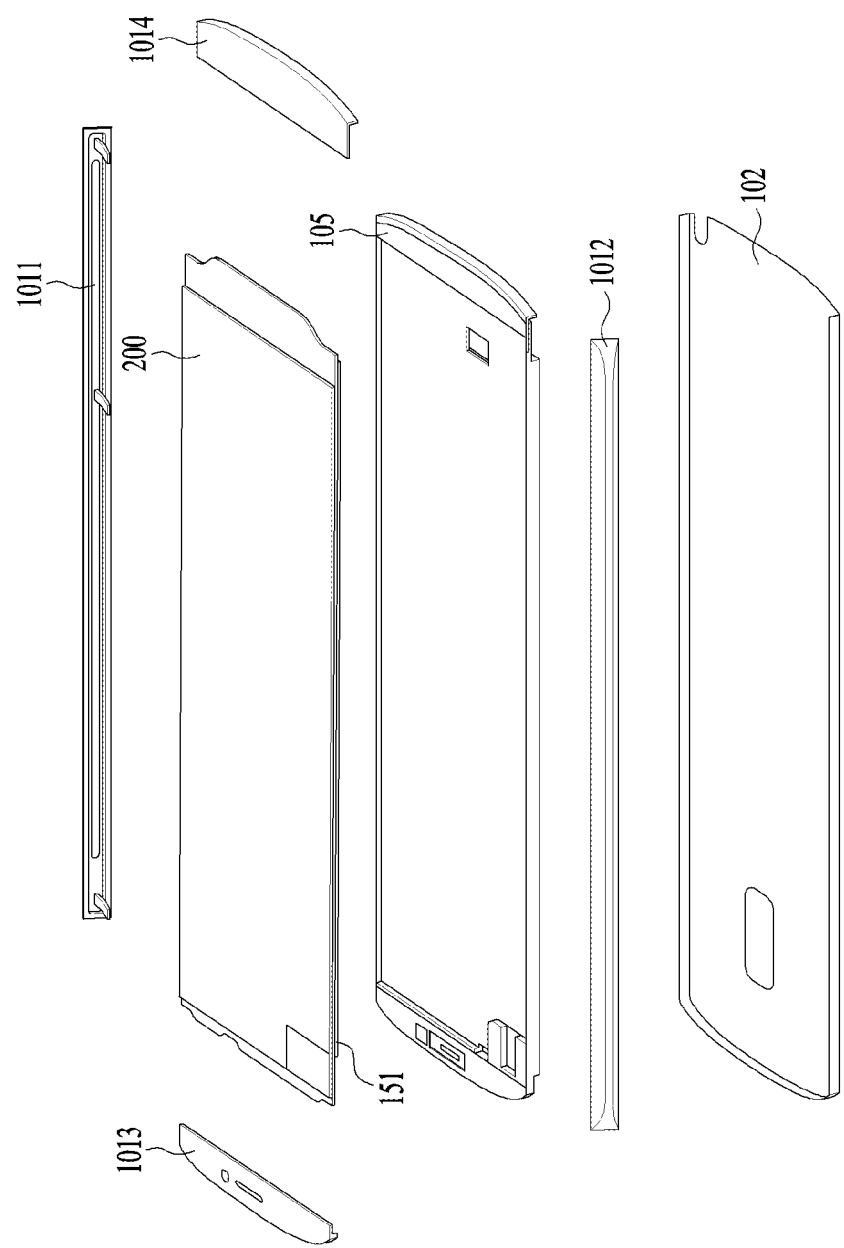

Shock-resistance

Bending stress

FIG. 6

| | | Conventional window glass (20) | | | Window glass (201) of the present disclosure Glass+Disposition+Glass | Window glass (202) of the present disclosure Glass+Disposition+Glass | Window glass (203) of the present disclosure Glass+Disposition+Glass | Window glass (204) of the present disclosure Glass+Disposition | Window glass (205) of the present disclosure Glass+Disposition |
|---|---|---|---|---|---|---|---|---|---|
| | | Pure Glass | | | Corning Glass 0.4T<br>OCA 0.05T<br>PET 0.1T<br>OCA 0.05T<br>Corning Glass 0.4T | Corning Glass 0.4T<br>OCA 0.05T<br>PET 0.1T<br>OCA 0.05T<br>Schott Glass 0.2T | Corning Glass 0.4T<br>OCA 0.05T<br>TAC 0.08T<br>OCA 0.05T<br>Schott Glass 0.2T | Corning Glass 0.4T<br>OCA 0.05T<br>PET 0.1T<br>OCA 0.05T<br>PC Sheet 0.2T | Corning Glass 0.4T<br>OCA 0.05T<br>TAC 0.08T<br>OCA 0.05T<br>PC Sheet 0.2T |
| | | 0.4T | 0.55T | 0.7T | | | | | |
| Image quality | Transmissivity | 92.28% | 92.29% | 92.25% | 91.62% | 91.37% | 91.91% | 90.56% | 91.10% |
| | Reflectivity | 8.15% | 8.06% | 8.07% | 8.94% | 8.64% | 8.51% | 9.50% | 9.07% |
| | Haze (0.4 top) | 0.05 | 0.05 | 0.05 | 0.33 | 0.34 | 0.16 | 0.47 | 0.33 |
| | Haze (0.4 bottom) | | | | 0.34 | 0.34 | 0.16 | 0.45 | 0.29 |
| Durability | 3PB (0.4 top) | Displacement 6.6 mm (114.2N) | Displacement 5.47 mm (241.8N) | Displacement 4.23 mm (359.6N) | Displacement 6.1mm (141.7N) | Displacement 6.1mm (145.5N) | Displacement 5.9mm (140.5N) | Displacement 6.8mm (145.7N) | Displacement 6.7mm (154.5N) |
| | 3PB (0.4 bottom) | | | | Displacement 7mm (149.1N) | Displacement 6.5mm (154.7N) | Displacement 5.8mm (128.3N) | Displacement 5.8mm (120.7N) | Displacement 5.3mm (126.2N) |
| | B/D (0.4 top) | 35cm | 35cm | 60cm | 110cm | 120cm | 110cm | 120cm | 120cm |
| | B/D (0.4 bottom) | | | | 80cm | 110cm | 90cm | 100cm | 110cm |

FIG. 7

| | Conventional window glass (20) | Window glass (202) of the present disclosure | Window glass (204) of the present disclosure |
|---|---|---|---|
| Structure | Glass 0.7T (Reference) | Glass 0.4T<br>OCA 0.05T<br>PET 0.1T<br>OCA 0.05T<br>Glass 0.2T | Glass 0.4T<br>OCA 0.05T<br>PET 0.1T<br>OCA 0.05T<br>PC Sheet 0.2T |
| Ball Drop | 1109 MPa | 307 MPa | 668 MPa |
| 3PB Displacement 0→10mm | Front surface / Rear surface<br>1911 MPa | Front surface / Rear surface<br>1360 MPa | Front surface / Rear surface<br>1130 MPa |

FIG. 15
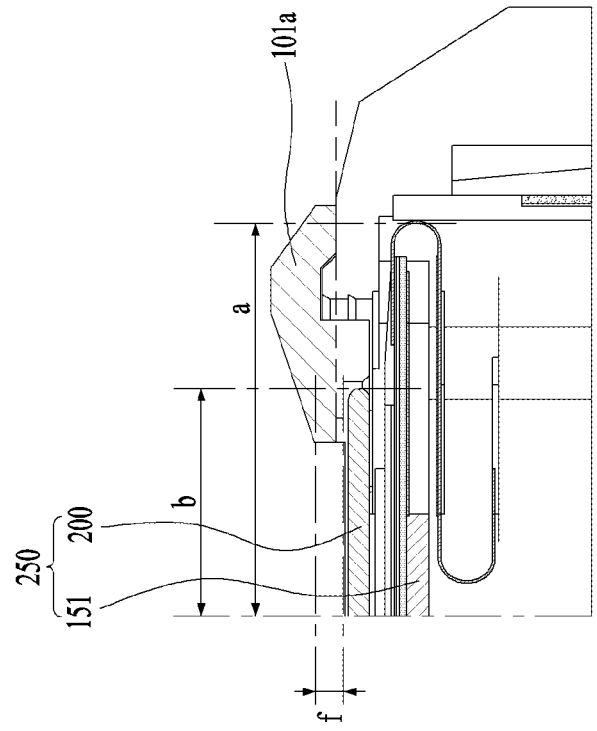
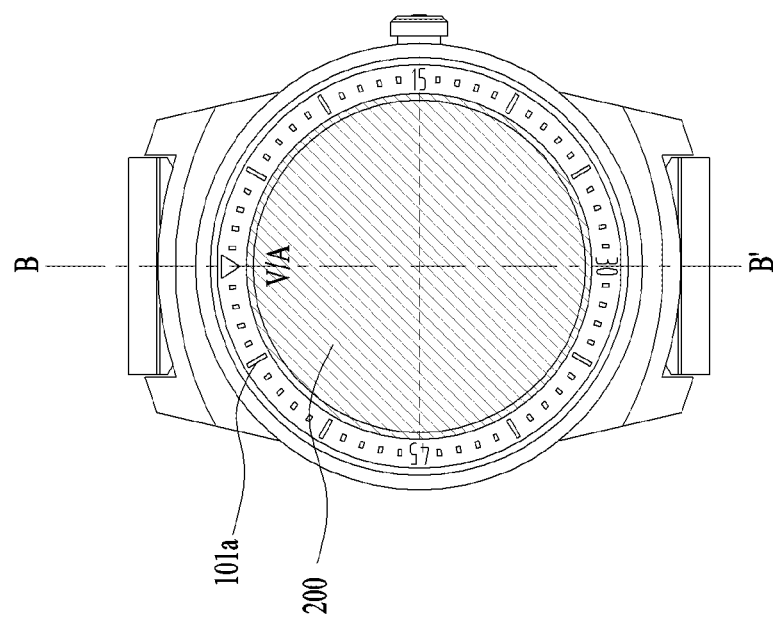

FIG. 16
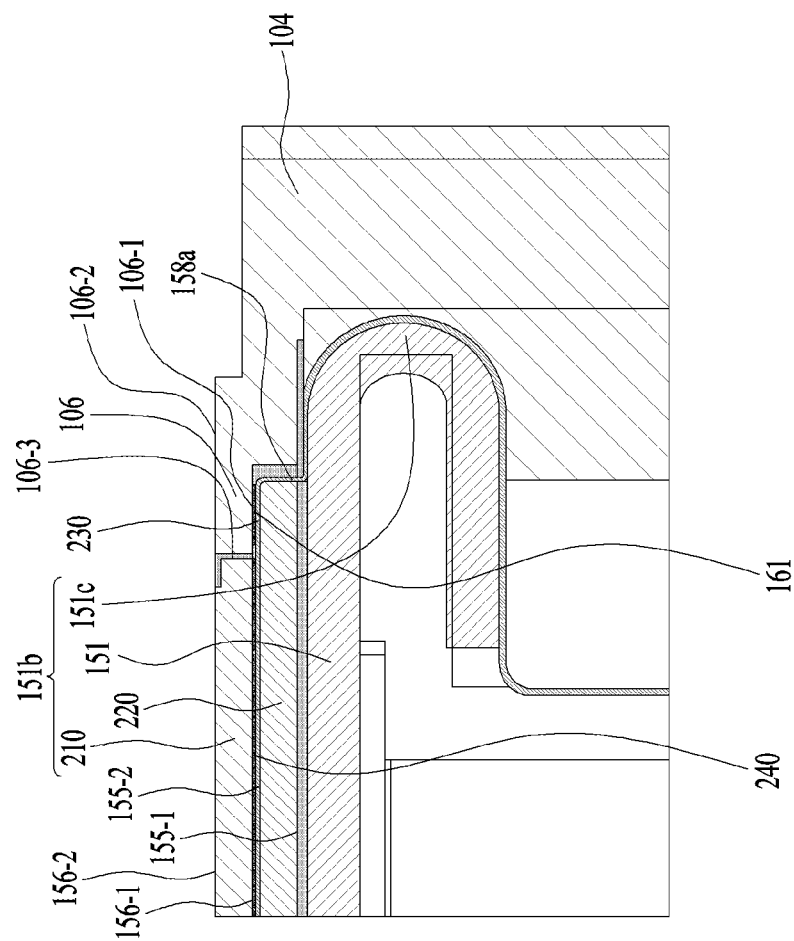
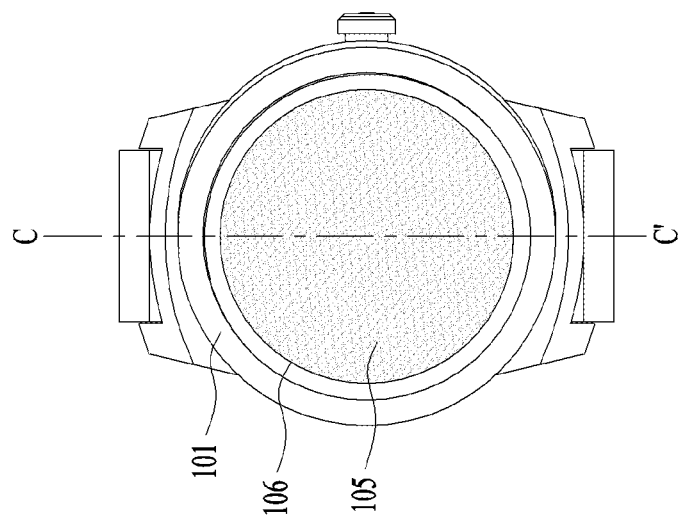

MOBILE TERMINAL

CROSS-REFERENCE TO RELATED APPLICATIONS

Pursuant to 35 U.S.C. § 119(a), this application claims priority to Korean Patent Applications Nos. 10-2014-0164443 filed on Nov. 24, 2014 and 10-2015-0079290 filed on Jun. 4, 2015 in Korea, the entire contents of which is hereby incorporated by reference in its entirety.

BACKGROUND OF THE DISCLOSURE

Field of the Disclosure

Embodiments of the present disclosure relate to a mobile terminal having a window designed to reduce bezel and to be resistant to an external shock.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As such multimedia functions become more diversified, the display unit becomes more enlarged. In another aspect, the other area of the front portion of the mobile terminal, except the area where the display unit is arranged, becomes smaller to as to minimize the size of the mobile terminal. For example, the bezel surrounding the edge of the display tends to become smaller so that a function of the bezel for protecting the display unit could deteriorate disadvantageously.

Accordingly, damage to the display unit occupies most of damage cases caused in the mobile terminals, more particularly, damage to a window disposed in a front surface of the mobile terminal to protect the display unit occupies most damage cases.

SUMMARY OF THE DISCLOSURE

Accordingly, an object of the present disclosure is to address the above-noted and other problems. Another object of the present disclosure is to provide a mobile terminal which may maintain transparency of a window arranged in a front surface thereof, with an improved rigidity.

A further object of the present disclosure is to provide a mobile terminal which may have no fragments even when the window is damaged.

Embodiments of the present disclosure may provide a mobile terminal including a frame comprising a front surface in which a display unit is loaded; a window disposed on a front surface of the display unit; and a front case configured to cover a predetermined area of the window, wherein the window includes a first window layer comprising a front surface exposed outside; a second window layer larger than the first window layer and comprising a first area of a front surface disposed to face a rear surface of the first window layer and a rear surface facing a front surface of the display unit; and an optical clear adhesive (OCA) provided between the first window layer and the second window layer, and the front case covers a second area arranged around the first area of a front surface of the second window layer.

The front surface of the window and the front surface of the front case may form a continuous plane.

The mobile terminal may further include a third window layer disposed between the first window layer and the second window layer.

The front case may include a first area in close contact with the window and a second area not overlapped with the window, and the first area may be thinner than the second area.

The thickness of the first area provided in the front case may be corresponding to the thickness of the first window layer and the third window layer.

The third window layer may include a bezel portion formed along an edge portion.

The third window layer comprises at least one of a touch sensor or a fingerprint recognition sensor.

The pair of the optical clear adhesives may be disposed on both surface of the third window layer, respectively.

The third window layer may be a transparent plastic film.

The third window layer may include polyethylene terephthalate (PET).

The first window layer may be thicker than the second window layer.

The front case may include an inner case formed of a hard material; and an outer case formed of a flexible material.

An end of the outer case may be fabricated in a bending process.

The bending-processed end of the outer case provided in the front case may be a first area in contact with the window.

The mobile terminal may further include a rear case coupled to the front case in direction of a rear surface and configured to form a profile of a rear surface of the mobile terminal, wherein an end of the outer case is arranged in a surface in contact with the rear case.

The first window layer and the second window layer may include Borosilicate glass or Alkali-aluminosilicate.

The second window layer may include polycarbonate. Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is an exploded perspective diagram illustrating one example of the mobile terminal in accordance with the present disclosure;

FIG. 6 is a table to arrange analysis of characteristics possessed by a conventional window and the window of the mobile terminal in accordance with the present disclosure;

FIG. 7 is a diagram visually showing the durability of the conventional window and that of the window provided in the mobile terminal in accordance with the present disclosure;

FIG. 15 is a diagram illustrating another example of the prior art related to the present disclosure; and FIG. 16 is a diagram illustrating one example of the smart watch in accordance with the present disclosure.

DESCRIPTION OF SPECIFIC EMBODIMENTS

Figure 1A:
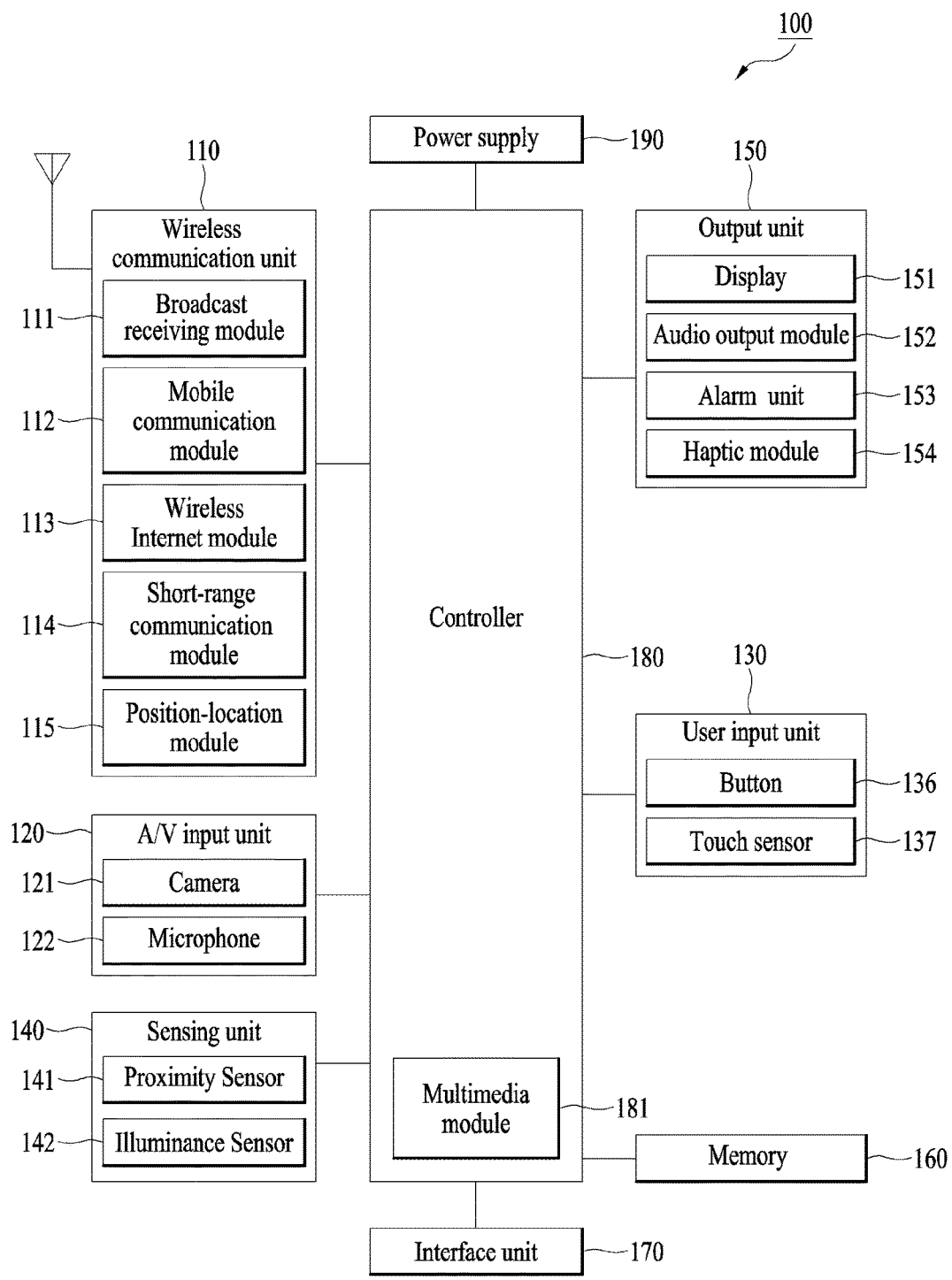
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
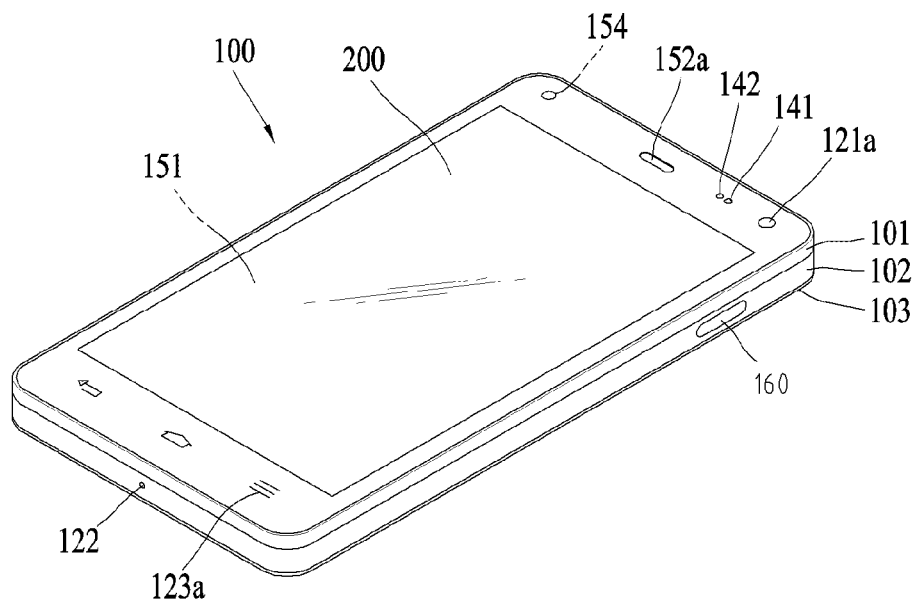
FIGS. 1B and 1C are conceptual views of one example of the mobile terminal, viewed from different directions.
Figure 1C:
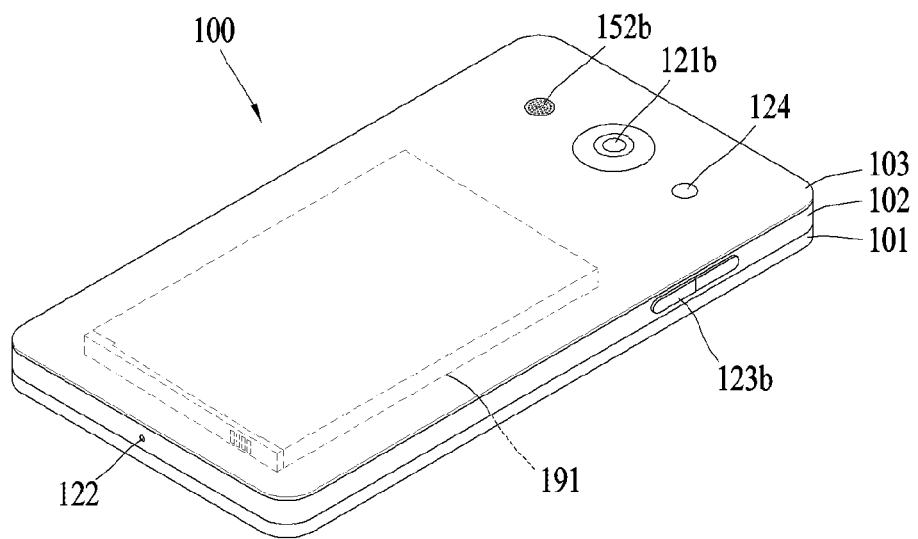

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereafter, embodiments related to a control method which may be realized in the mobile terminal having the configurations mentioned above will be described in detail, referring to the accompanying drawings. It should be understood that the embodiments presented herein are not limited by the accompanying drawings. As such, the present disclosure should be construed to extend to any alterations, equivalents and substitutes in addition to those which are particularly set out in the accompanying drawings.

FIG. 2 is an exploded perspective diagram illustrating one example of the mobile terminal in accordance with the present disclosure. Referring to FIG. 2, one example of the mobile terminal in accordance with the present disclosure includes a window 200 arranged in a front surface, a display unit 151, a frame 105, a front case 101 and a rear case 102.

The display unit 151 is disposed in a front surface of the frame 105 and various components are disposed in the frame 105. The frame 105 includes a metallic material to be provided as a ground and a predetermined area of the metallic portion is employed as an antenna. An injection molding for surrounding the metallic material is configured to receive various components and the injection molding is fabricated according to the use of the metallic material provided in the frame 105.

The window 200 is disposed in the front surface of the display unit 151 to protect the display unit 151. A conventional window 200 is characterized as a single layered window. In contrast, the window 200 provided in the mobile terminal in accordance with the present disclosure is characterized as a multilayered window.

Diverse electronic components including a printed circuit board and a battery are loaded in a back surface of the frame 105. The frame 105 includes a rear case 102 coupled to the back surface of the rear case 102, in case the mobile terminal is a battery exchangeable type.

The front case 101 composes an exterior design of the mobile terminal, together with the window 200 and the rear case 102. The front case 101 may be formed in a rectangular shape which covers four lateral surfaces of the window 200. Alternatively, the front case 101 may be configured of independent upper, lower, right and left parts coupled to the four lateral surfaces of the window, respectively. The front case 1011, 1012, 1013 and 1014 may be extended from the front surface of the mobile terminal to cover lateral surfaces of the mobile terminal 100 as well as the front surface of the mobile terminal 100.

An injection molding and a metallic material may be used so as to form the front case or divided parts of the front case may be formed of two different materials.

Figure 3:
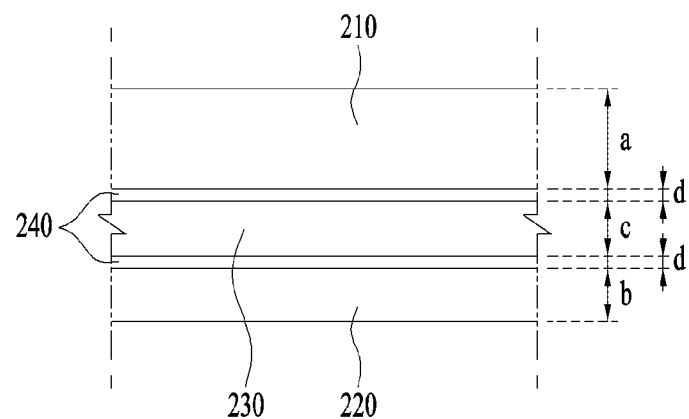
FIG. 3 is a sectional diagram of a window provided in one example of the mobile terminal in accordance with the present disclosure.

FIG. 3 is a sectional diagram of a window 200 provided in one example of the mobile terminal in accordance with the present disclosure. The window 200 provided in one example of the mobile terminal in accordance with the present disclosure has at least two layers, not a single layer. In this embodiment, the window 200 includes a first window layer 210, a third window layer 230 and a second window layer 220. A bonding layer 240 is provided between each two of the window layers to bond each two of the window layers to each other. The window 200 is configured of the multilayers mentioned above, so that an external shock applied to the window 200 can be dispersed enough to minimize damage to the window 200.

Figure 4A:
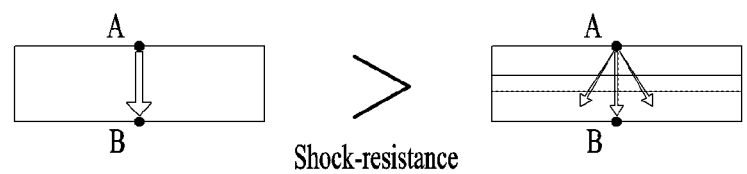
FIGS. 4A and 4B are diagrams illustrating characteristics of a window provided in the mobile terminal in accordance with the present disclosure.

FIG. 4 is a diagram illustrating characteristics of the window 200 provided in the mobile terminal in accordance with the present disclosure. In the window formed of one material shown in FIG. 4A, the shock applied to A point of the window is directly transmitted to B point. In the window 200 formed of the multilayers, the shock applied to A point becomes weaker and the shock is dispersed in a border area between each two layers in a lateral direction, when transmitted to B point, only to be reduced effectively.

In addition, a gap between each two layers is pushed and the stress caused by the bending (or warpage) applied to the layers is then minimized, so that the damage to the window can be prevented. The stress applied to the material by the bending is called a bending stress. The larger the bending stress is, the more resistant it is to the bending.

Figure 4B:
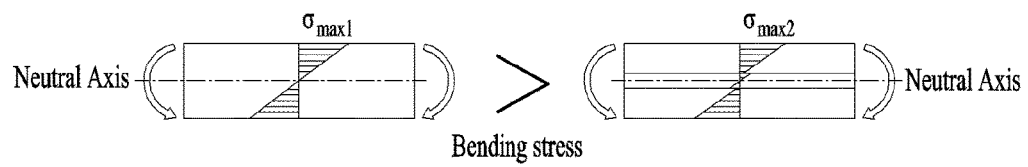

Referring to FIG. 4B, a neutral axis is formed in a center of the window along a direction of the thickness, when the bending warpage (the outward rotation while the user is holding right and left sides) is applied to the window 200 formed of one material. The neutral axis means the position having no change in lengths along the direction of the thickness when the bending is generated.

Different bendings are generated in upper and lower portions with respect to the neutral axis, respectively. As shown in the drawing, a tensile force is applied to the upper portion with respect to the neutral axis and a compressive force is applied to the lower portion with respect to the neutral axis. The farther is from the neutral axis, the more bending (contraction or tension) is generated. Accordingly, the stronger bending stress is applied and then the maximum bending stress (omax1) is generated in the surface of the window.

Meanwhile, the position of the neutral axis is changed in each of the multilayers provided in the window 200 (in the drawing, only the neutral axis of the middle layer is shown). As the bending stress transmitted between each two of the layers is reduced, the maximum bending stress (omax2) actually applied to the surface of the window 200 is smaller than the maximum bending stress (omax1) applied to the surface of the window 200 configured of the single layer or material.

The window includes an optical clear adhesive 240 disposed in each of both surfaces of the third window 230. Rolling laminate or direct bonding may be used as a method for disposing the plurality of the window layers 210, 220 and 230. The former of the two methods have advantages of less expensive electrons and the less time taken to dispose the window layers. However, the latter of the two methods has an advantage of a lower detect rate.

Figure 5:
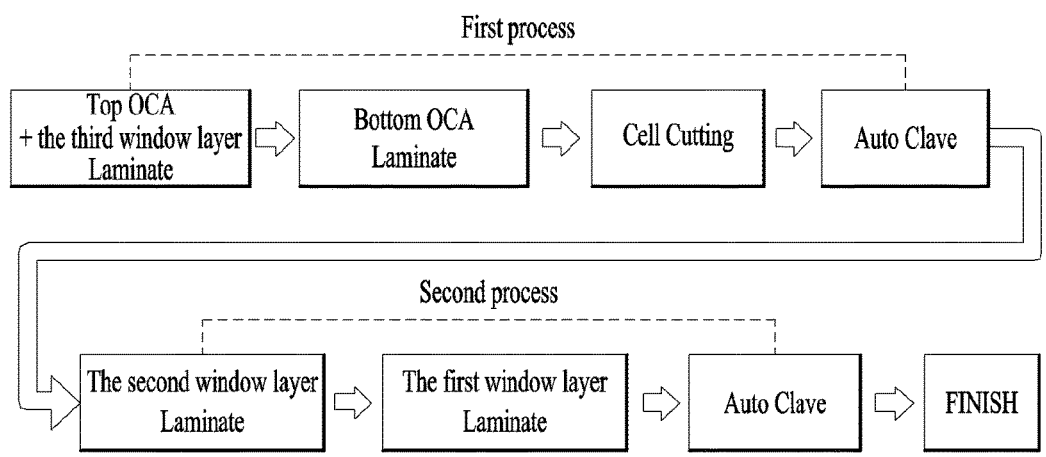
FIG. 5 is a flow chart illustrating a process to fabricate the window of the mobile terminal in accordance with the present disclosure.

FIG. 5 is a flow chart illustrating processes (e.g., rolling laminate) to fabricate the window 200 of the mobile terminal in accordance with the present disclosure. A first process is configured to bond the optical clear adhesives (OCA) to both surfaces of the third window layer 230, respectively. In the first process, the optical clear adhesives 240 are disposed on one surface and the other surface of the third window layer 230 and the third window layer 230 having the optical clear adhesives disposed thereon is cut to the size of the window 200 and then compressed. In a second process, the second window layer 220 and the first window layer 210 are disposed on the optical clear adhesives bonded to the both surfaces of the third layer and then compressed, so that the window 200 can be formed 200.

The rolling laminate is the method for disposing the optical clear adhesives 240 on a substantially large film and cutting after that. In contrast, the direct bonding is the method for cutting film by the cell unit and disposing the optical clear adhesives on the cut cell film units. In the direct bonding, the optical clear adhesives are disposed, fitted to reference points located in a center and left and right corners, and compressed in a manner of autoclave, only to form the window 200.

The layers of the window 200 may be formed of one identical material or different materials having different characteristics. Glass has a high transparency and hardness which are advantageous to scratch and a low rigidity which may be a disadvantage of easy damage caused by an external shock. Accordingly, the glass may be used for the first window layer 210 and the second window layer 220 arranged in outer portions and transparent film may be used for the third window layer 230 provided in an inner portion.

Borosillicate glass including boracic acid or Alkali-aluminosilicate glass including alumina elements may be used as the glass. Following Table 1 shows properties of representative Borosillicate glass and Alkali-aluminosilicate glass. D263eco T of Schott is Borosillicate glass. Gorilla glass 3 and Gorilla glass 4 of Corning are Alkali-aluminosilicate glass.

TABLE 1

| Classification | | Schott (D 263 eco T) | Corning (Gorilla glass 3) | Corning (Gorilla glass 4) |
| --- | --- | --- | --- | --- |
| Materialistic characteristics | Categorization | Borosilicate glass includes boracic acid, with a high | Alkali-aluminosilicate glass includes alumina | Alkali-aluminosilicate glass includes alumina |

TABLE 1-continued

| Classification | | Schott (D 263 eco T) | Corning (Gorilla glass 3) | Corning (Gorilla glass 4) |
|---|---|---|---|---|
| | | chemical resistance and a high heat-resistant shock sensitivity. | elements, with a high acid resistance. | elements, with a high acid resistance. |
| Mechanical characteristics | Mohs hardness | 7 | 7 | 7 |
| | Young's modulus | 72.9 GPa | 69.3 GPa | 65.8 Gpa |
| Optical characteristics | Refractive index | 1.52 | 1.5 | 1.51 |
| | Transmissivity | 92% | 91.5% | 91.5% |

Borosilicate glass has an excellent chemical resistance, a high transmissivity and a large Young's modulus, so that a ultra-thin glass having the thickness of 0.03~1.1 mm can be manufactured in a manner of Drawn-Draw configured to draws molten glass downwardly to manufacture thin glass. Borosilicate glass has a higher transmissivity than Alkali-aluminosilicate glass.

Borosilicate glass is the glass with a high Al2O3 and Na2O content. Al2O3 is employed to activate substitution between Na+ and K+ and to ease the chemical strengthening generated by ion exchange of Na+ ion and K+ ion. Borosilicate glass may be manufactured as 0.4~1.1 mm glass and has an advantage of a high chemical strength.

The first window layer 210 exposed outside may be formed of Borosilicate glass and the second window layer 220 facing the display unit 151 may be formed of Alkali-aluminosilicate glass. Both of the first and second window layers 210 and 220 may be formed of Borosilicate glass or Alkali-aluminosilicate glass, to configurate the window 200.

The third window layer 230 may be formed of a polymer material having a high tensile strength and a good optical transmissivity. Examples of such a polymer material include PEP (Polyethylene terephthalate) and PC (Polycarbonate). Following Table 2 shows properties of PET and PC.

TABLE 2

| Classification | | PET | PC Sheet |
|---|---|---|---|
| Materialistic characteristics | Composition | Polyethylene terephthalate has a high strength and a high heat-resistant. | Polycarbonate has a good optical transmissivity and a good shock-resistance/heat-resistance. |
| Mechanical characteristics | Tensile strength | 6.58 kgf/mm$^2$ | 16.9 kgf/mm$^2$ |
| Optical characteristics | Refractive index | 1.65 | 1.59 |
| | Transmissivity | 91.2% | 88~91% |

The tensile strength of PET is 6.58 kgf/mm$^2$ and that of PC is 16.9 kgf/mm$^2$. The tensile strength means the maximum strength applied to a transparent film strongly not to tear the transparent film. The higher the tensile strength is, the less damage is caused in the transparent film. When a force is applied to the transparent film, the transparent film has no damage in a range of the tensile strength and the appearance of the transparent film is changed, so that it can be resistant to an external shock or a bending-direction force.

The tensile strength of PC is higher than that of the PET. However, the transparency of PET is higher than that of PC advantageously. The window 200 is arranged in the front surface of the display unit 151. Accordingly, it is preferred that a material with a high transparency is used for the window 200 so as to reduce light loss by transmitting the light emitted from the display unit 151 as much as possible.

The window 200 including the third layer 230 formed of such the polymer material (e.g., a transparent film) may have an improved strength. Even if such the window 200 is damaged, damaged glass may not scattered by the optical clear adhesives 240 and the injury caused by glass fragments can be avoided. Also, the mobile terminal can be used after the damage to the window 200.

Diverse-multilayer-structured window 200 may be provided according to the composition of the glass material and the polymer material.

FIG. 6 is a table to arrange analysis of characteristics possessed by a conventional window 20 and the window 200 of the mobile terminal in accordance with the present disclosure. A left part of the table shows characteristics according to thicknesses of the conventional window 200 formed of the single glass material. A right part of the table shows characteristics of the window 201, 202, 203, 204 and 205 in accordance with the present disclosure.

The window 201, 202, 203, 204 and 205 in accordance with the present disclosure is configured of the first window layer, the third window layer and the second window layer which are disposed to form the multilayer structure. The optical clear adhesives are provided between each two of the window layers to bond the layers to each other.

To make the window 200 have the same thickness of 0.7 mm as the conventional window 20, the first window layer having the thickness of 0.4 mm, the second window layer having the thickness of 0.2 mm and the third window layer having the thickness of 0.1 mm are multilayered, with the optical clear adhesive having the thickness of 0.05 mm disposed between each two of the layers, so that the overall thickness of the window 201, 202, 203, 204 and 205 may be 0.8 mm.

In the window 201 and 202 in accordance with first and second embodiments of the present disclosure, the first window layer 210 and the second window layer 220 are formed of glass and the third window layer 230 is formed of PET film having the multilayer structure, except the material used for the second window layer 220. The second window layer 220 of the window in accordance with the first embodiment is formed of Borosilicate glass and the second window layer 220 of the window in accordance with the second embodiment is formed of Alkali-aluminosilicate glass.

In the window 203 in accordance with a third embodiment, the first window layer 210 and the second window layer 220 are formed of glass and the third window layer 230 is formed of TAC (tri-acetyl-cellulose) film. TAC film is one of polarizing films and has good optical characteristics, compared with PET film. TAC film has a high transmissivity and it has a low reflectivity and a low Haze, compared with PET film. Accordingly, TAC film may minimize distortion of an image output from the display unit 151.

In the window 204 in accordance with a fourth embodiment of the present disclosure, the first window layer 210 is formed of glass and the third window layer 230 is formed of PET film, which is identical to the first embodiment and the second embodiment. In the window 205 in accordance with a fifth embodiment of the present disclosure, the first window layer 210 is formed of glass and the third window layer 230 is formed of TAC film, which is identical to the third embodiment, except the second window layer 220 formed of PC (Polycarbonate) transparent sheet.

PC film is one of thermos-plastic materials and has a high shock-resistance, a high heat-resistance, a high weather-proof and transparency. PC film has also a shock-resistance which is approximately 150 times or more as high as tempered glass. Accordingly, PC film has a good flexibility and a good workability.

PC film having 90% or more than the transmissivity of 90%, less than the reflectivity of 10% and the haze of 1% as characteristics related to the image quality may be used as the window. The transmissivity of the window with the multilayer structure provided in the mobile terminal in accordance with the present disclosure is a little bit lower than that of the conventional window 20 or both of the windows have the transmissivity of 90% or more. The reflectivity and the haze of the window in accordance with the present disclosure is less than a reference value, so that it can be useable as the window 200 arranged in the front surface of the display unit 151.

The window 200 in accordance with the first through third embodiments which includes the first and second window layers 210 and 220 formed of glass is superior to the window in accordance with the fourth and fifth embodiments which includes the second window layer 220 formed of PC film. The window in accordance with the first, second and fourth embodiments which includes the third window layer 230 formed of PET film is superior to the window in accordance with the third and fourth embodiments which includes the third window layer 230 formed of TAC film.

When the positions of the first and second window layers are exchanged, the reflectivity and durability performance of the first and second window layers are measured in an aspect of the reflectivity and the durability. The case of the first window layer being exchanged with the second window layer is identical to the case of the window being overturned. Accordingly, the portion where (0.4 down) is disclosed shows the result of the experiments performed when the window is overturned.

The result of B/D (Ball Drop) experiments to examine durability for a shock and the result of 3PB (Three Point Bending) to examine durability for bending warpage are shown.

The 3PB experiments gain displacement of both ends and a center of the window, until the window is broken by the force applied to both ends of the window toward the first window layer 210 and a center of the window toward the second window layer 220 to bend the window. Numbers in brackets refer to the stress applied to the window glass when the window is broken.

As numbers gained from 3PB are getting larger, it means that the window is more flexible and the window is not easily broken. Numbers gained from 3PB of the window 210, 202, 203, 204 and 205 in accordance with the present disclosure are 6.1 mm and 7 mm which are larger than 0.7 mm gained from 3PB and which are equal to the thickness of the conventional window 20.

Ball Drop experiments for damaging the window by dropping a metallic ball are performed to measure the shock resistance of the window. The conventional window 20 having the thickness of 0.4 mm or 0.55 mm is broken by the metallic ball dropped from 35 cm high. The glass of the conventional window 20 having the thickness of 0.7 mm is broken by the metallic ball dropped from 60 cm high.

In contrast, the window 201 and 201 in accordance with the present disclosure having the first window layer provided in an upper surface is broken by the metallic ball dropped from 110 cm high. In case it is overturned to arrange first window in a lower surface, the window 200 is broken by the metallic ball dropped from 80~110 cm high. That height in case of the window 200 is approximately twice as large as the height in case of the conventional window 20. Accordingly, it may be said that the window 201 and 202 in accordance with the present disclosure is more resistant to the external shock than the conventional window 20. The window of which the upper surface the first window layer 210 with the thickness of 0.4 mm is arranged in is more resistant to the external shock. In other words, the window is more resistant to the external shock in case the window glass exposed outside is thick.

Drop experiments may be performed as another method for measuring the durability or shock-resistance. In Drop experiments, a mobile terminal is dropped several times in different directions and that is one set and it is determined which set the window is broken in. The conventional window 20 broken in the second set when dropped from 1 m high and in the first set when dropped from 1.2 m high. However, the window 201 and 202 in accordance with the present disclosure has cracks in corners in the second set when dropped from 1.2 m high and it is not broken even in the fifth set or higher sets when dropped from 1.9 m high.

FIG. 7 is a diagram visually showing the force applied to each area of the window of the mobile terminal in accordance with the present disclosure in the Ball Drop and bending warpage experiments. In FIG. 7, the window in accordance with the second and fourth embodiments of the present disclosure is compared with the conventional window 20.

According to the result of Ball Drop experiments, the shock applied to the darkest colored area is the strongest. In the three types of the windows, the central area where the ball is dropped has the darkest color and the color is getting less dark toward the edge area. The absolute value of the shock applied to the area where the ball is dropped is 1109 MPa in the conventional window. The absolute value of 1109 MPa in the conventional window is substantially larger than 307 MPa in the window 202 in accordance with the second embodiment or 668 MPa in the window 204 in accordance with the fourth embodiment.

Accordingly, the window in accordance with the present disclosure is hardly affected by some shocks based on the result of the experiments.

The bending warpage experiments measure the force (or the bending stress) applied to each area of the window when the window is bending for edge areas and a central area to have displacement of 10 cm. According to the result of the bending warpage, the central area has the darkest color and the color is getting less dark toward the edge areas. The force applied to the central portion of the window is the strongest and the forces applied to the other areas are getting weaker toward the edge areas.

The absolute value of the bending stress applied to the conventional window is 1911 MPa and the absolute value of the bending stress applied to the window 202 and 204 is 1360 MPa and 1130 mPa which are smaller than the absolute value of the bending stress applied to the conventional window. Accordingly, it is sure that the window in accordance with the present disclosure actually receives less stress when it is bending to a predetermined degree.

Figure 8:
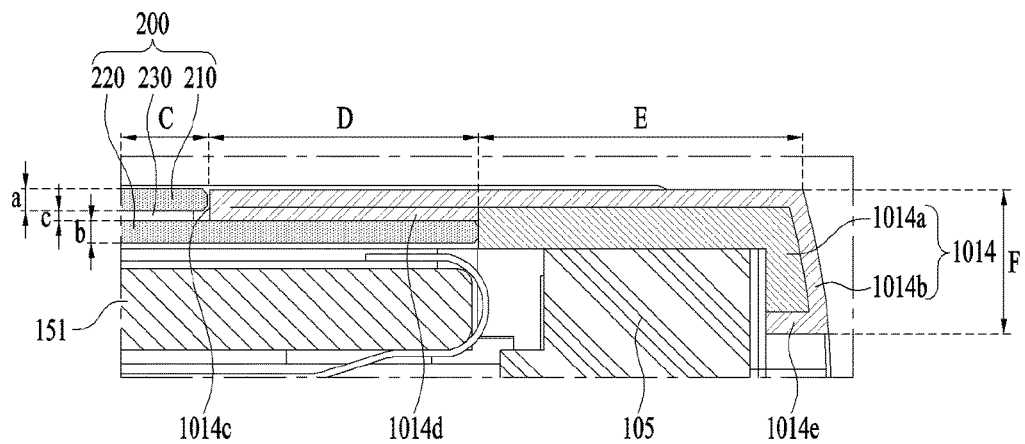
FIG. 8 is a sectional diagram illustrating a lower vertical cross sectional area of one example of the mobile terminal in accordance with the present disclosure.

FIG. 8 is a sectional diagram illustrating a lower vertical cross sectional area of one example of the mobile terminal in accordance with the present disclosure. Referring to FIG. 2, the front case may be configured of lateral surfaces, a top part and a low part which have different profiles. In the display unit 151 may be arranged a driving IC configured to drive the display unit 151, a backlight unit and a user input unit such as a home button. Accordingly, the lower part 1014 of the front case covering a lower portion of the display unit 151 is overlapped with the window 200 in more areas than the lateral surfaces 1011 and 1012 of the front case. The front case 102 has a larger area than the width for covering the window actually 200, so that an interface (e.g., USB port), an antenna and an ear jack are arranged lower than the window 200.

The front case 1014 may be formed of a plastic injection product, a metallic material or a flexible material (e.g., leather and fabric). It is difficult to keep the profile, in case leather or fabric is used for the front case 1014. Accordingly, an inner case 1014a formed of an injection molding or a metallic material may be provided to keep the profile of the front case 1014, when the front case 1014 is formed of leather or fabric, and such flexible material is covered with the inner case 1014a to define an external case 1014b. After that process, the front case 1014 may be fabricated.

An edge area of the window 200 is overlapped with the front case 1014 to fix the window 200. In such the overlapped structure, a step may be generated in a border area between the window 200 and the front case 1014 disadvantageously. To overcome the disadvantage of the step, the overlapped area (D) of the window with the front case 1014 may be formed thinner than the central area (C) of window. In other words, the thickness of the overlapped area with the front case 1014 is smaller than the thickness of the area (C) not overlapped with the front case 1014 and a step is formed between the two areas (D) and (C).

In the conventional window 20 configured of one glass material, a step is formed in an edge area. Accordingly, it is difficult to fabricate the window with different thicknesses of a central area and an edge area. However, the window 200 in accordance with the present disclosure is configured of the window layers 210, 220 and 230. Accordingly, the sizes of the window layers 210, 220 and 230 are differentiated to form a thin edge area of the window 200.

Figure 9:
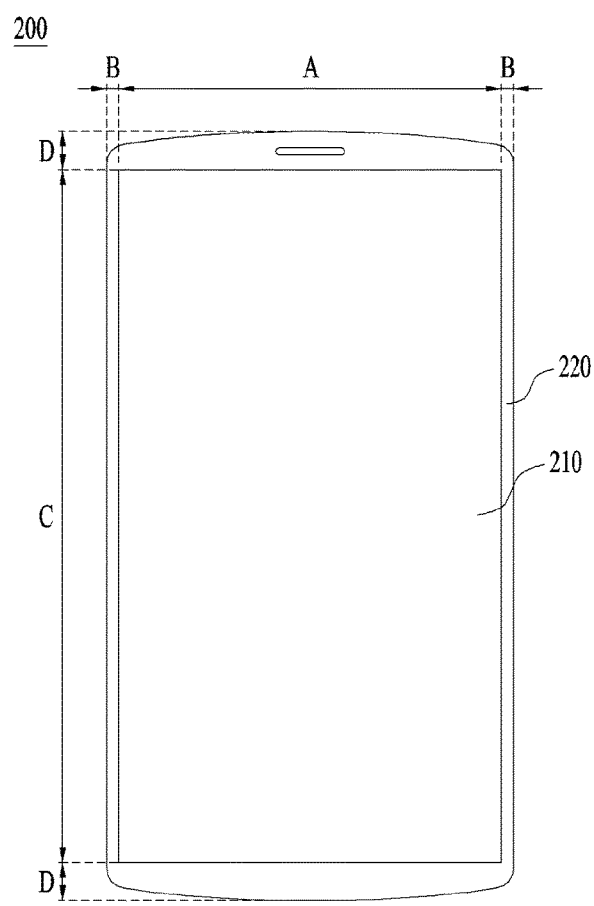
FIG. 9 is a front view of a window provided in the mobile terminal in accordance with the present disclosure.

FIG. 9 is a front view of a window provided in the mobile terminal in accordance with the present disclosure. in FIG. 9, the second window layer 220 is formed larger than the first window layer 210 to be more projected (B and D) outwardly than the first window layer 210. The horizontally projected distance may be different from the vertically projected distance. The horizontally projected portion (B) of the second window layer 220 may be smaller than the vertically projected portion (D) of the second window layer 220 so as to make smaller the horizontal size of the bezel.

The more outwardly projected portion (B) of the second layer 220 may be overlapped with the front case 1014.

As shown in FIG. 8, the overlapped portion (D) of the front case 1014 with the window 200 has a predetermined thickness corresponding to the overall thickness (a+c) of the first and second window layers 210 and 230. When the thickness of the portion (C) of the front case 1014 is equal to the overall thickness (a+c) of the first and third window layers 210 and 230, a continuous plane may be provided in the front surface of the mobile terminal 100, with no step generated in the border area between the front case 1014.

When the overall thickness of the front case 1014 is corresponding to the thickness of the first and third window layers 210 and 230, the rigidity could deteriorate and a step 1014f may be then formed in an inner portion of the front case to make thinner the overlapped portion (D) of the front case 1014 with the window 200.

The front case 1014 in accordance with the present disclosure may be configured of an inner case 1014a and an outer case 1014b. Accordingly, only the outer case 1014b may be arranged in the overlapped portion with the window as shown in FIG. 9.

Especially, in case the outer case 1014b is formed of a flexible material such as fabric or leather, a cut-away surface is exposed and easily damaged. Accordingly, an edge area of the outer case 1014b may be folded and finished as shown in FIG. 7 and the thickness of the outer case 1014b may be a half the sum of the thicknesses of the first and third window layers 210 and 230.

The front case 1014 may not only the front surface but also the lateral surface of the mobile terminal 100, specifically, some areas of the lateral surface. The front case 1014 may be extended to the lateral surface of the mobile terminal 100 and an end 1014e of the extended portion to the lateral surface may be arranged to face the rear case 102 or the frame 105 in close contact.

An end of the outer case 1014b may be arranged in the end 1014e not exposed outside in close contact with the front case 1014 and another material (the rear case or the frame) as shown in FIG. 8.

Figure 10:
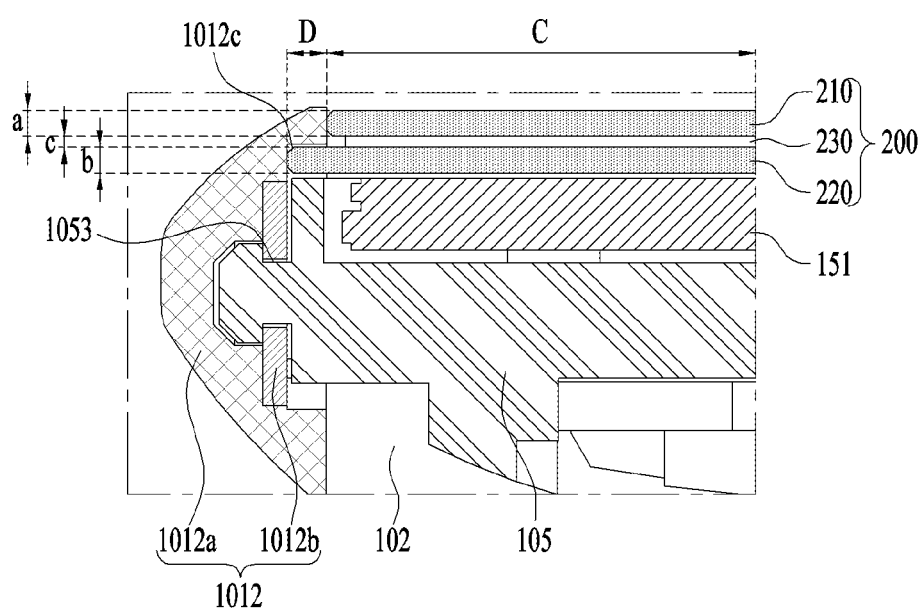
FIG. 10 is a sectional diagram illustrating a vertical cross sectional area of a lateral surface possessed by one example of the mobile terminal in accordance with the present disclosure.

FIG. 10 is a sectional diagram illustrating a vertical cross sectional area of a lateral surface possessed by one example of the mobile terminal 100 in accordance with the present disclosure. different from the lower front case 1014 configured of the inner case 1014a and the outer case 1014b, the front case 1012 provided in the lateral surface may be formed of a metallic or plastic material. As shown in FIG. 10, the front case 1012 may define not only the front surface but also the lateral surface of the mobile terminal 100.

Like the front case 1014 provided in the lower part, a step 1012c is formed in the front cases 1011 and 1012 provided in right and left parts so that they may not be more projected toward the front surface than the window 200.

The length of the step 1012c formed in the front case 1012 is corresponding to the length of the projected portion (D) of the second window layer 220 which is generated because the second window layer 220 is larger than the first window layer 210. The thickness of the step 1012c is corresponding to the overall thickness (a+c) of the first and third window layers 210 and 230.

The front cases 1011 and 1012 arranged in right and left portions of the mobile terminal 100 may be coupled to the frame 105 to be fixed stably. Coupling grooves 1053 extended along a longitudinal direction of the mobile terminal are formed in right and left ends of the frame. The coupling grooves 1053 shown in FIG. 10 may be formed in symmetry with front and rear surfaces of the frame 105.

Coupling rails 1012b configured to be inserted in the coupling grooves 1053 of the frame 105 are projected from the front case 1012 along the longitudinal direction of the mobile terminal 100, corresponding to the coupling grooves 1053.

The coupling rail 1012b may be formed of an auxiliary material independent from the exposed portion of the front case 1012 or integrally formed with the exposed portion of the front case 1012. The front case 1012 provided in right and left portions of the mobile terminal may be coupled to the frame 105, when it is pushed along the longitudinal direction to slide the coupling rails 1012b along the extended direction of the coupling grooves 1053 from the upper portion or the lower portion of the mobile terminal.

Figure 11:
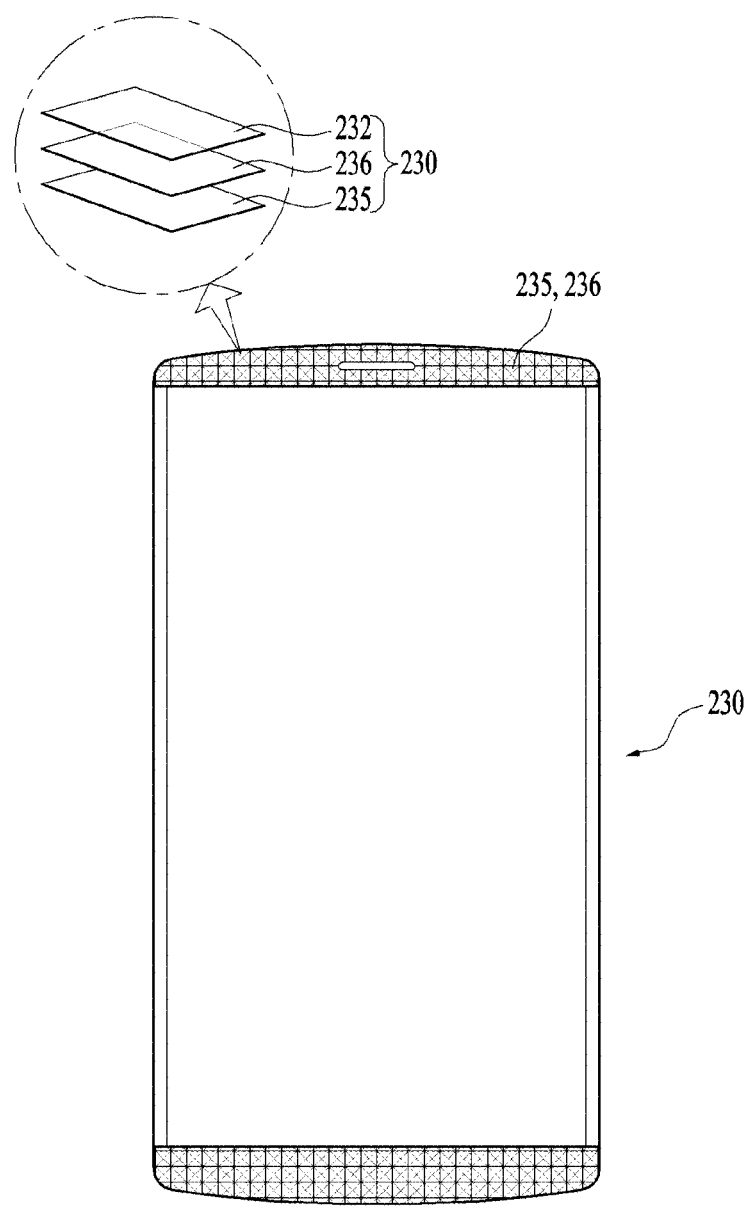
FIG. 11 is a diagram illustrating one example of a third window layer provided in the window of the mobile terminal in accordance with the present disclosure.

FIG. 11 is a diagram illustrating one example of the third window layer 230 provided in the window 200 of the mobile terminal in accordance with the present disclosure. Bezel portions 235 and 236 may be formed on the third window layer 230 in an edge portion of the window 200 to cover a non-visible area of the display unit 151.

A film 236 having a UV pattern designed thereon is disposed on a PET film 232 and colors are printed (235) on the UV pattern-designed film 236, only to realize the bezel portions 235 and 236 having various colors and patterns.

When they are formed in the rear surface of the window, the bezel portions 235 and 236 could be damaged in the manufacturing processes. However, the bezel portions 235 and 236 are arranged in the window 200 so that an error rate can be lowered.

FIG. 12 is a sectional diagram illustrating various examples of the third window layer 230 provided in the window 200 of the mobile terminal in accordance with the present disclosure. A touch panel may be formed between the disposed window layers. The touch panel is fabricated by arranging a transparent electrode on a transparent film so as to provide the user with the image output from the display unit 151 disposed behind the touch panel.

Transparent electrodes 145a and 145b are formed in the third window layer 230 as the transparent film used in forming the touch panel, to realize a touch sensor 145. The touch sensor 145 detects capacitance variation generated between two transparent electrodes 145a and 145b to sense a touch input.

Figure 12A:
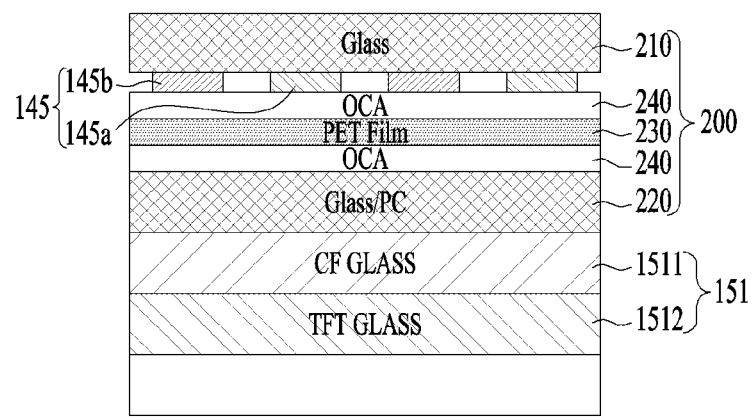
FIGS. 12A through 12E are sectional diagrams illustrating diverse examples of the third window layer provided in the window of the mobile terminal in accordance with the present disclosure.
Figure 12B:
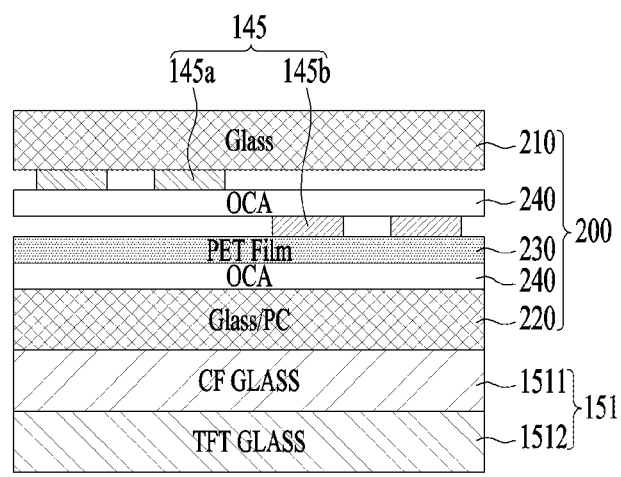
Figure 12C:
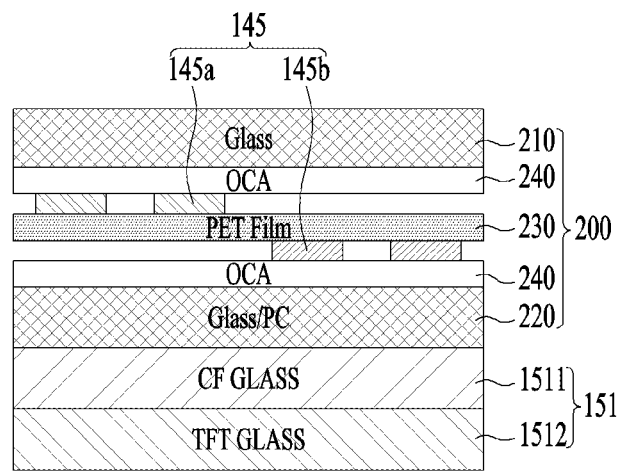
Figure 12D:
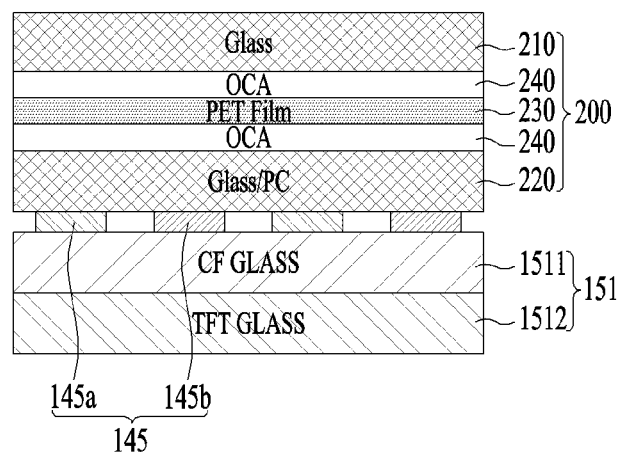
Figure 12E:
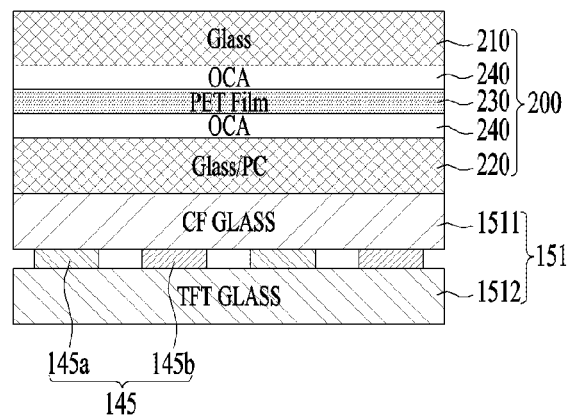

The transparent electrodes 145a and 145b may be formed in the first window layer 210 as shown in FIG. 12A. Or, a first transparent electrode 145a may be formed in the first window layer 210 and a second transparent electrode 145b may be formed in the third window layer 230 as shown in FIG. 12B. The transparent electrodes may be formed in one surface or both surfaces of the third window layer 230 as shown in FIG. 12C. FIGS. 12D and 12E illustrate a touch sensor integrally formed with the display unit 151. The window glass 200 in accordance with the present disclosure may be applied to an upper surface of the display unit 151 including such the touch sensor 145.

The window glass in accordance with the present disclosure may be applied to a wearable device. Examples of the wearable device include a smart watch, a smart glass and HMD (Head mounted display).

The wearable device may exchange (or link) data with other mobile terminals. The short-range communication module 114 provided in the mobile terminal may sense (or recognize) a communicable wearable device near the mobile terminal. By extension, the controller 180 may transmit at least some of the data processed in the mobile terminal to the sensed wearable device, using the short-range communication module 114, in case the sensed wearable device is a device authorized to communicate with the mobile terminal. Accordingly, the user may use the data processed in the mobile terminal via the wearable device. For example, when the mobile terminal receives a call, the user may answer the call via the wearable device. When the mobile terminal receives a texture message, the user can check the received message via the wearable device.

Figure 13:
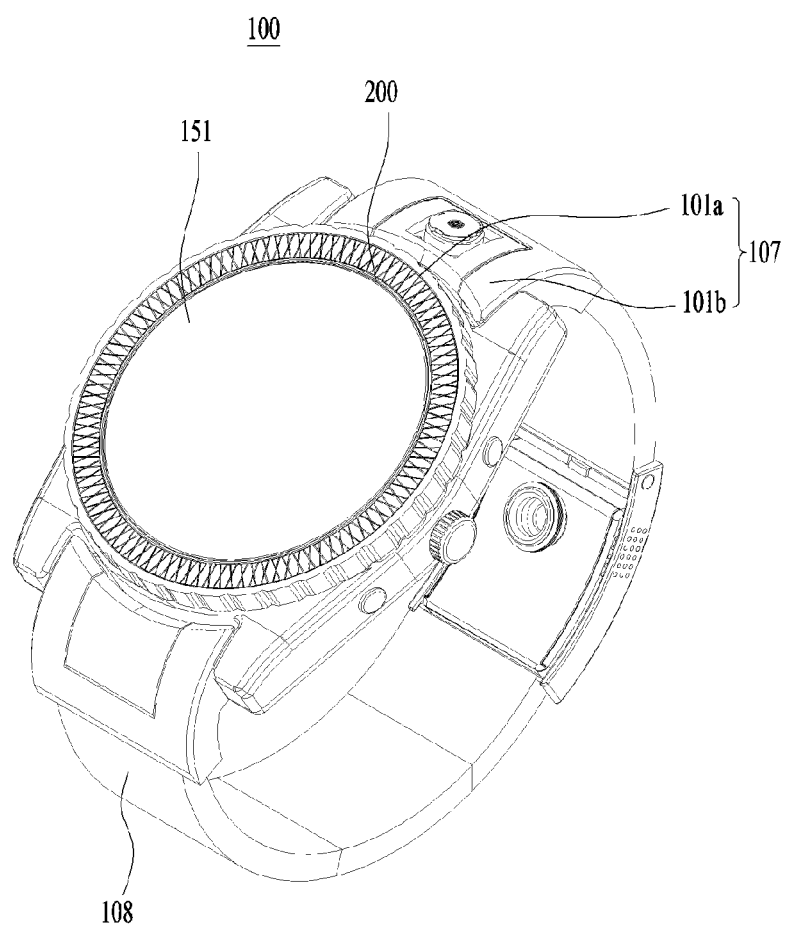
FIG. 13 is a perspective diagram illustrating one example of a smart watch in accordance with the present disclosure.

FIG. 13 is a perspective diagram illustrating one example of a smart watch in accordance with the present disclosure.

Referring to FIG. 13, the mobile terminal 100 includes a body 107 having a display unit 151 and a band 108 connected with the body 107 to be wearable on the wrist. The body 107 includes a case for defining a profile of the body. As shown in the drawing, the case may include a first case 101 and a second case 102 configured to provide an internal space where diverse electronic components are loaded. The present disclosure is not limited thereto and one case is provided to form the internal space. Accordingly, the uni-body mobile terminal 100 may be realized.

The display unit 151 may be arranged in a front surface of the body 107 to output information. The display unit 151 may include a touch sensor to be realized as a touch screen. As shown in the drawing, a window 200 of the display unit 151 may be coupled to the first case 101 and it may define the front surface of the terminal body, together with the first case 101.

An audio output unit, a camera, a microphone 122, a user input unit (not shown) and the like may be provided in the terminal body 107. In case it is realized as the touch screen, the display unit 151 may be functioned as the user input unit (123, see FIG. 1) and no auxiliary key may be provided in the terminal body 107.

The band 108 is configured to be windingly worn on the wrist and it may be formed of a flexible material to ease the wearing process. Examples of the flexible material used for the band 108 include leather, rubber, silicon, synthetic resin and the like. The band 108 may detachably connected to the body 107, so that the user may exchange various types of bands with each other if desired.

Meanwhile, the band 108 may be used in expanding functions of the antenna. For example, a ground expansion unit (not shown) embedded in the band 108 may be electrically connected to the antenna to expand a ground area.

Figure 14:
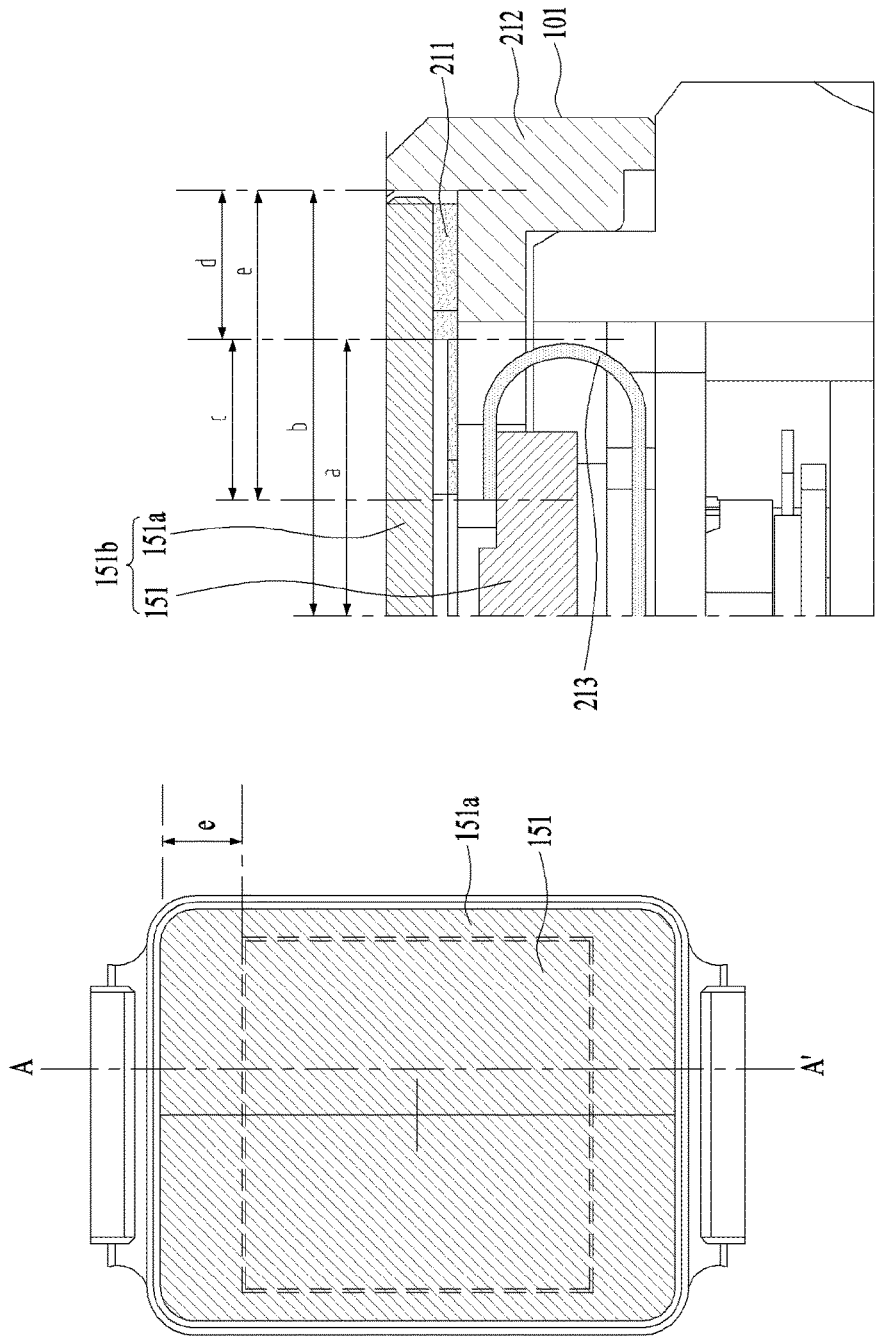
FIG. 14 is a diagram illustrating one example of prior art related to the present disclosure.

FIG. 14 is a diagram illustrating one example of prior art related to the present disclosure.

A flexible PCB (FPCB) 213 connected with the display unit 151 is required so as to use the display unit 151 as the user input unit (123, see FIG. 1), in case the display unit 151 is realized as the touch screen. For explanation sake, the direction in which the window 151a of the mobile terminal is provided is defined as an upper direction. A predetermined portion of the flexible PCB 213 is required to be jointed to one end of the upper surface of the display unit 151. Accordingly, the distance (C) from an edge of the flexible PCB 213 to one end of the surface of the display unit 151 has to be a bezel area having a necessary length. A window 151a for protecting an exterior appearance has to be provided in the upper surface of the display unit 151. When a connection module 151b of the display unit 151 and the window 151a are coupled to the first front case 101 in a direction from a top to a bottom of the mobile terminal, an area (d) for coupling the window 151a and the first front case 101 to each other has to be provided. Premised on the assumption that the display module 151b is coupled to the first front case 101 downwardly from the upper portion of the mobile terminal, the width (e) of the bezel is the sum of c and d.

To reduce the size of the bezel, the display module 151b may be coupled to the first front case 101 upwardly from a lower portion of the first front case 101. In this instance, there is an area overlapped with c (see FIG. 3) and d (see FIG. 3) and then the width-direction size of the bezel may be reduced advantageously.

FIG. 15 is a diagram illustrating another example of the prior art related to the present disclosure.

When the display module 151b is coupled to the first front case 101a upwardly from the lower portion of the first front case 101a to reduce the bezel, a step (f) is generated from an upper surface of the window 151a to a top area of the area where the first front case 101a and the window 151a are coupled to each other. In case the display unit 151 is the touch screen, the step (f) can cause the user to feel uncomfortable in touching a border area between the first front case 101a and the window 151a or to fail to touch a desired area. In addition, foreign substances could be sucked in the step and the display unit might be contaminated.

FIG. 16 is a diagram illustrating one example of the smart watch in accordance with the present disclosure.

The case 101 may have a hole 105 formed in an upper surface to locate the display module 250. A front rim of the case 101 or the hole 105 of the case may be circular-shaped. In case the front rim of the case 101 and the hole 105 of the case are circular-shaped, there is no corner and the user's catching on the corner is minimized and the circular shape may be convenient to use the wearable device. The circular shape is similar to a conventional watch shape and it brings an esthetic effect, different from a rectangular shape. In this instance, the maximum width of the bezel portion has to be uniformly the width of the overall bezel portion. To minimize such the bezel, the display module 250 may be coupled to the case 101 from the lower portion of the case 101, not from the upper portion of the case 101 which is an outer portion.

Corresponding to the circular hole 105, the second window layer 220 and the first window layer 210 may be also circular-shaped.

When the display module 250 including the window glass 200 and the display unit 151 is coupled to an inner portion of the case 101, in other words, upwardly from the lower portion of the mobile terminal 100, the second window layer 220 may be larger than the hole 105 to fix the window glass 200 to the case 101, without separation. The second window layer 220 is provided in a lower surface 106-1 of a hole circumference 106 so that the display module 250 having the second window layer 220 may be fixed to the case 101, preventing its separation.

A lower surface 156-1 of the first window layer 210 is coupled to an upper surface 155-2 of the second window layer 220 and a lateral surface of the first window layer 210 may be in contact with an inner lateral surface 106-3 of the hole circumference 106 formed in the case 101. The upper surface 156-2 of the first window layer 210 and the upper surface 106-2 of the hole circumference 106 may form the same plane to prevent the user's discomfort in touching and foreign substances from being stuck there between.

Hereinafter, one embodiment will be described that the third window layer arranged between the first window layer 210 and the second window layer 220 is the touch sensor 145. The optical clear adhesive (OCA, 200) is provided in the area formed between the touch sensor 145 and the second window layer 220, to adhere the touch sensor 145 and the second window layer 220 to each other.

An adhesive material 161 may be provided between the touch sensor 145 and a border area where the hole 105 of the case 101 is formed, to adhere the touch film 158 to the lower surface 106-1 of the hole circumference.

The optical clear adhesive (OCA, 240) and the adhesive material 161 may prevent water induction to the mobile terminal to have a water-proof function.

The thickness of the second window layer 220 and the first window layer 210 may be 0.4 mm. when the touch sensor 145 is arranged in the upper surface of the display unit 151 (OLED in this embodiment), the distance from a touch generation point in the upper surface 210-2 of the first window layer 210 to the touch film 158 is at least 0.8 mm. If the distance from the touch generation point to the touch film 158 is more than 0.8 mm, touch signal input may not be performed easily. However, when the touch sensor 145 is provided between the second window layer 220 and the first window layer 210, the distance from a touch generation point in the upper surface 210-2 of the first window layer 210 to the touch sensor is 0.4 mm and good touch sensitivity can be maintained.

One end of the touch sensor 145 may include an extended portion 158a to be connected to the PCB arranged in a lower direction of the display module 250. The extended portion 158a is downwardly bent between a lateral surface of the second window layer 220 and the case 101 and it is curved along a curved surface 151c of the flexible PBC (not shown) or the display unit (151, OLED in this embodiment).

The thickness of the first window layer 210 may be uniform from an edge area to a central area or increasing from the edge area to the central area. When the thickness is increasing from the extreme edge area to the central area, a higher rigidity may be provided than the uniform thickness of the first window layer 210 is uniform. The first window layer 210 has a streamlined surface and it may protect the window 200 from a vertical direction shock applied to the surface. At this time, the thickness of the central portion which is the thickest is 1.2 mm or less so that a touch sensitivity level over a predetermined level may be maintained.

As mentioned above, the mobile terminal in accordance with the present disclosure may include the window 200 which may keep transparency, with an improved rigidity, to reduce breakage of the window 200. In addition, even when the window 200 is broken, no fragments are generated and the safer mobile terminal may be provided.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a frame including a front surface in which a display device is provided;
   a window disposed on a surface of the display device; and
   a front case configured to cover a predetermined area of the window,
   wherein the window includes:
      a first window layer having a front surface and a rear surface, the front surface being exposed to outside of the mobile terminal;
      a second window layer, larger than the first window layer, and the second window layer having a front surface and a rear surface, wherein the front surface of the second window layer includes a first area disposed to face the rear surface of the first window layer and a second area, the front case to cover the second area of the front surface of the second window layer around the first area, and the rear surface of the second window layer to face a surface of the display device; and
      an optical clear adhesive (OCA) provided between the first window layer and the second window layer;
   wherein a thickness of the first window layer is approximately twice a thickness of the second window layer.

2. The mobile terminal of claim 1, wherein a front surface of the window is parallel with a front surface of the front case.

3. The mobile terminal of claim 1, further comprising:
   a third window layer disposed between the first window layer and the second window layer.

4. The mobile terminal of claim 3, wherein the third window layer includes a bezel portion formed along an edge portion.

5. The mobile terminal of claim 3, wherein a pair of the optical clear adhesives are disposed on both surfaces of the third window layer.

6. The mobile terminal of claim 3, wherein the third window layer is a transparent plastic film.

7. The mobile terminal of claim 3, wherein the third window layer includes polyethylene terephthalate (PET).

8. The mobile terminal of claim 1, wherein the front case includes a first area in close contact with the window and a second area that is non-overlapping with the window.

9. The mobile terminal of claim 4, wherein a thickness of the first area of the front case corresponds to a total thickness of the first window layer and the third window layer.

10. The mobile terminal of claim 1, further comprising:
    at least one of a touch sensor and a fingerprint recognition sensor provided between the first window layer and the second window layer.

11. The mobile terminal of claim 8, wherein the front case includes:
    an inner case at the second area of the front case; and
    an outer case covering the inner case at the second area of the front case, and the outer case being folded to form two layers at the first area of the front case.

12. The mobile terminal of claim 11, further comprising:
    a rear case coupled to the front case to form a profile of a rear surface of the mobile terminal,
    wherein an end of the outer case is arranged at a surface that contacts the rear case.

13. The mobile terminal of claim 1, wherein the first window layer and the second window layer include Borosilicate glass or Alkali-aluminosilicate.

14. The mobile terminal of claim 1, wherein the second window layer comprises polycarbonate.

15. The mobile terminal of claim 1, further comprising:
    an adhesive material provided between an edge of the second window layer and the front case.

16. The mobile terminal of claim 1, wherein a hole and a front rim of the front case are circular-shaped, and a width of the front rim is uniform.

17. The mobile terminal of claim 16, wherein an upper surface of the first window layer is thicker toward a central portion.

18. A mobile terminal comprising:
    a display;
    a frame;
    a window on a surface of the display; and
    a front case having a first area in close contact with the window and a second area that is non-overlapping with the window,
    wherein the window includes:
       a first window layer having a first surface and a second surface;
       a second window layer, larger than the first window layer, and the second window layer having a first surface and a second surface; and
       a third window layer between the first window layer and the second window layer;
       a first optical clear adhesive (OCA) between the first window layer and the third window layer; and
       a second optical clear adhesive between the third window layer and the second window layer,
       wherein the first surface of the second window layer has a first area that faces the third window layer and a second area that corresponds to an overlap portion of the window, the front case to cover the second area of the second window layer, and the second surface of the second window layer to face the display,
    wherein the front case includes:
       an inner case at the second area of the front case; and
       an outer case covering the inner case at the second area of the front case, and the outer case being folded to form two layers at the first area of the front case.

19. The mobile terminal of claim 18, wherein a thickness of the first area of the front case corresponds to a total thickness of the first window layer, the first OCA, the third window layer and the second OCA.

20. The mobile terminal of claim 1, wherein the front case comprises first front cases provided at right and left sides of the frame,
    wherein the mobile terminal comprising:
       coupling grooves extended along a longitudinal direction of the mobile terminal are provided at right and left ends of the frame, and
       coupling rails projected from the first front case, and the coupling rails are configured to be inserted in the coupling grooves.

* * * * *